United States Patent Office.

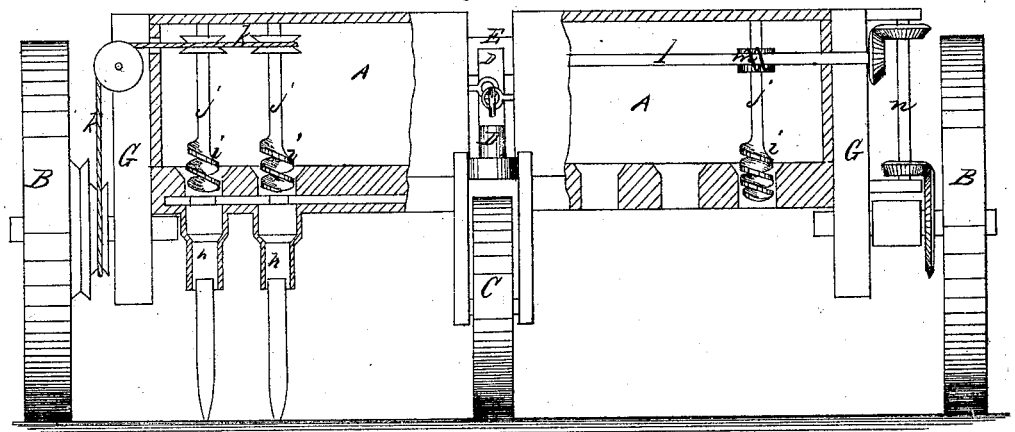
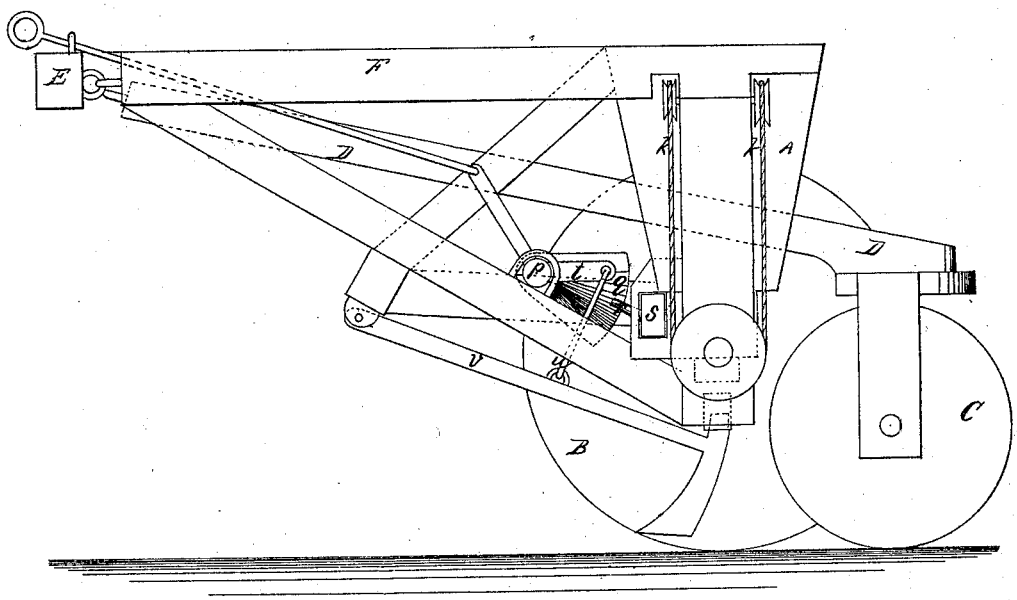

OLIVER HYDE, OF OAKLAND, CALIFORNIA.

Letters Patent No. 113,522, dated April 11, 1871.

IMPROVEMENT IN SEED-DRILLING MACHINES.

The Schedule referred to in these Letters Patent and making part of the same.

*To all whom it may concern:*

Be it known that I, OLIVER HYDE, of Oakland, county of Alameda, State of California, have invented an Improved Seed-Drilling Machine; and I do hereby declare the following description and accompanying drawing are sufficient to enable any person skilled in the art or science to which it most nearly appertains to make and use my said invention or improvements without further invention or experiment.

The object of my invention is to provide a seed-drilling machine which will be particulary suitable for hitching on behind a steam-plow or other cultivator, for sowing the grain after the ground has been prepared by the cultivator.

My drilling-machine can also be used independently of the plow or cultivator when desired, and be drawn by horses over the previously-plowed field; and It consists, first, in uniting two or more hoppers or separate grain-boxes by hinged joints so that, when several are united together so as to operate in a line, each one will be capable of adjusting itself to the level of the land over which it moves independent, in a measure, of the ones to which it is attached.

It also consists in a peculiar device for feeding the grain from the hoppers into the seed-tube so that a regular and uniform feed shall be kept up at all times.

It further consists in a novel arrangement for opening and closing the slide which shuts off the grain in the hopper from the feeding-tube when it is desired to cease feeding.

In order to more fully explain my invention reference is had to the accompanying drawing forming a part of this specification, in which—

Figure 1 is a transverse, vertical section.

Figure 2 is a side elevation.

A represents the hoppers, in which the grain to be planted is carried. These hoppers are mounted on any suitable frame.

I have here represented two of these frames connected together by hinges or other flexible joints, and supported on their outer ends by bearing-wheels B; but any number of hoppers can be united thus in order to plant the entire width of the machine which they follow.

A wheel, C, is mounted upon one end of a beam, D, which extends forward between each two hoppers, and to which the hoppers are attached by a flexible joint, leaving the wheel C to support the abutting ends of the hoppers.

The beam D extends in front of the hoppers and is secured to a transverse timber, E, to which the frame-timbers F and G are also secured, the entire attachment being by flexible joints, as shown.

By this means of construction and attachment each hopper will adjust itself automatically to the unevenness of the ground over which it passes.

The grain is fed from the hoppers into the grain-pipes $h$ by means of vertical screws $i$.

These screws are formed on or secured to the lower end of a shaft, $j$, whose upper end bears in the cover of the hopper, while the screw extends a short distance down into the opening which leads to the feed-pipes.

The shaft $j$ can either be driven by means of belting from the hubs of the outside bearing-wheels B, as shown at $k$, or a horizontal shaft, $l$, may extend longitudinally across the hopper, and be provided with a worm, $m$, which engages with a toothed wheel on the shaft $j$.

In the latter case the shaft $l$ will be driven by a vertical shaft, $n$, which is provided with bevel-wheels, and is also driven by the hubs of the driving-wheels.

The screws $i$ in their revolutions carry a steady and uniform quantity of grain down into the seed-tube, from which it passes to the drill where it is planted.

Bearing in the timbers of the frame and in front of the seed-box is a horizontal shaft, $p$, upon which is fixed a screw-blade, $q$.

Two pins, $r\ r$, project from the slide S, between which the screw $q$ moves.

An arm, $t$, also projects from the shaft $p$, which is connected by a link, $u$, with the drill-bar $v$, so that when the shaft $r$ is turned in one direction the screw-blade will cause the slide $s$ to cut off the feeding of the grain to the feed-pipes and at the same time elevate the drill out of the ground.

The reverse revolution of the shaft lowers the boot or drill into the ground and allows the grain to descend for planting.

Having thus described my invention,

What I claim, and desire to secure by Letters Patent, is—

1. The hoppers A A, connected together by flexible joints or hinges, in combination with the beam D and wheel C, the whole hinged or linked to the transverse timber G, or equivalent device, substantially as and for the purpose above described.

2. The screw-blade $q$ and pins $r\ r$ in combination with the shaft $p$, arm $t$, and the slide $s$, substantially as and for the purpose above described.

In witness that the above-described invention is claimed by me I have hereunto set my hand and seal.

OLIVER HYDE. [L. S.]

Witnesses:
J. L. BOONE,
GEO. H. STRONG.